US012657230B2

(12) United States Patent
Palit et al.

(10) Patent No.: US 12,657,230 B2
(45) Date of Patent: Jun. 16, 2026

(54) METHOD AND SYSTEM FOR TOPIC-BASED CLASSIFICATION OF SCIENTIFIC PAPERS TO RESEARCH PROPOSAL

(71) Applicant: Tata Consultancy Services Limited, Mumbai (IN)

(72) Inventors: Rudra Nath Palit, Pune (IN); Manasi Samarth Patwardhan, Pune (IN); Lovekesh Vig, New Delhi (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 19/205,221

(22) Filed: May 12, 2025

(65) Prior Publication Data

US 2025/0355920 A1     Nov. 20, 2025

(30) Foreign Application Priority Data

May 17, 2024     (IN) ............................. 202421038907

(51) Int. Cl.
G06F 16/35          (2025.01)
G06F 16/38          (2019.01)

(52) U.S. Cl.
CPC ............ G06F 16/35 (2019.01); G06F 16/382 (2019.01)

(58) Field of Classification Search
CPC ....... G06F 16/35; G06F 16/382; G06F 16/353
See application file for complete search history.

(56) References Cited

U.S. PATENT DOCUMENTS

| 8,265,925 B2 * | 9/2012 | Aarskog ............... G06F 40/289 |
| | | 707/706 |
| 11,373,041 B2 * | 6/2022 | Ni .......................... G06F 40/279 |
| 11,699,177 B1 * | 7/2023 | Alexandrov .......... G06F 16/951 |
| | | 707/738 |
| 12,124,496 B2 * | 10/2024 | Wen .................. G06F 16/24578 |

(Continued)

OTHER PUBLICATIONS

P. Wang et al., "ToC-RWG: Explore the Combination of Topic Model and Citation Information for Automatic Related Work Generation", IEEE Access, vol. 8, 2020, pp. 13043-13055 (2019).

(Continued)

*Primary Examiner* — Merilyn P Nguyen
(74) *Attorney, Agent, or Firm* — Finnegan, Henderson, Farabow, Garrett & Dunner, LLP

(57) ABSTRACT

For categorizing literature for a specific target proposal, authors face challenges while organizing their papers in diverse ways. Embodiments of the present disclosure provide method and system for classification of scientific papers to research proposal based on topic. A constructed dataset with a positive and negative reference text spans are augmented to obtain an extended dataset. Top-k chunks from a reference paper relevant to the citation text are considered as the reference text spans. A topic-based retriever model is trained on subset of the extended dataset by the positive reference text span, and the negative reference text span. A topic classifier model is trained using research proposal title, the proposal topic, and the reference text span from the reference paper to classy if the reference paper is aligned to the topic. A reference paper to be relevant to the proposal topic is classified with corresponding topics in the research proposal.

15 Claims, 9 Drawing Sheets

(56) References Cited

U.S. PATENT DOCUMENTS

| | | | | |
|---|---|---|---|---|
| 12,512,187 | B2 * | 12/2025 | Vold | G06F 40/166 |
| 2017/0344541 | A1 * | 11/2017 | Haeusler | H04L 67/535 |
| 2019/0347748 | A1 * | 11/2019 | Brooke | G06F 16/285 |

OTHER PUBLICATIONS

X. Li, et al., "Cited Text Spans for Scientific Citation Text Generation", 14 pages (2024).

Chrysoula Zerva et al., "Cited text span identifcation for scientifc summarization using pre-trained encoders", Scientometrics, 29 pages (2020).

P. Wang et al., "Cited text spans identification with an improved balanced ensemble model", Scientometrics, 35 pages (2019).

A. Cohan et al., "Matching Citation Text and Cited Spans in Biomedical Literature: a Search-Oriented Approach", Human Language Technologies: The 2015 Annual Conference of the North American Chapter of the ACL, pp. 1042-1048 (2015).

S. Ma et al., "Automatic identification of cited text spans: a multiclassifier approach over imbalanced dataset", Scientometrics, 28 pages (2018).

A. Pandey et al., "CitRet: A Hybrid Model for Cited Text Span Retrieval", Proceedings of the 29th International Conference on Computational Linguistics, pp. 4528-4536 (2022).

J. Mucke et al., "Fine-Tuning Language Models for Scientific Writing Support" (2023).

X. Li et al., "Explaining Relationships Among Research Papers" (2024).

* cited by examiner $R, \{t_j\}, \{p_i\}$ receiving, via one or more hardware processors, a constructed
dataset as an input data using at least one existing research paper
502 augmenting, via the one or more hardware processors, the
constructed dataset with at least one reference text span to obtain
an extended dataset 504 training, via the one or more hardware processors, a topic-based
retriever (TR) model on a subset of the extended dataset by at least
one pseudo positive reference text span, and at least one pseudo
negative reference text span 506

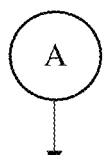

training, via the one or more hardware processors, a topic classifier (TC) model on a subset of the extended dataset using the research proposal title, at least one proposal topic, and at least one reference text span from at least one reference paper retrieved using at least one pseudo positive reference text span retrieved using the citation text based retriever model which is labelled as positive, and at least one pseudo negative reference text span for at least one reference paper which is labelled as negative, to classy if at least one reference paper is aligned to the proposal topic or not

508 classifying, via the one or more hardware processors, at least one reference paper to be relevant to at least one proposal topic in context of at least one reference text span retrieved using the topic-based retriever (TR) model with the topic classifier (TC) model 510

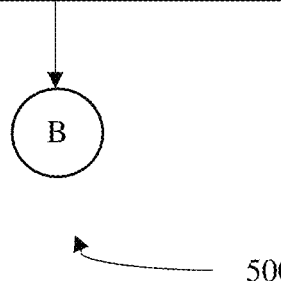

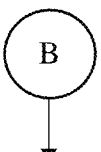

inputting, via the one or more hardware processors, the research proposal title, the abstract R, and the proposal topic from a test set to the TR model along with each chunk of a reference paper in the test set tagged to be relevant to the R to calculate the similarity score 512 obtaining, via the one or more hardware processors, at least one top k chunk from the reference paper relevant to the topic of the proposal using the TR model based on the similarity score 514 inputting, via the one or more hardware processors, at least one top k chunk from the reference paper along with the topic and the proposal to the TC model 516 iteratively classifying, via the one or more hardware processors, the reference paper as a positive or a negative, highlighting if the reference paper is relevant to at least one proposal topic or not in context of at least one top-K chunk 518

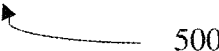    500

FIG. 5C

METHOD AND SYSTEM FOR TOPIC-BASED CLASSIFICATION OF SCIENTIFIC PAPERS TO RESEARCH PROPOSAL

PRIORITY CLAIM

This U.S. patent application claims priority under 35 U.S.C. § 119 to: India application No. 202421038907, filed on May 17, 2024. The entire contents of the aforementioned application are incorporated herein by reference.

TECHNICAL FIELD

This disclosure relates generally to data classification techniques, and, more particularly, to a method and system for topic-based classification of scientific papers to research proposal.

BACKGROUND

A conception of a research agenda is usually initiated via writing an elaborate research proposal which highlights relevance of a proposed idea and corresponding novelty with respect to prior work. Researchers frequently draft research proposals to present new ideas, defining the research agendas, and seeking approvals for funding grants. An integral aspect of the proposal writing process is reviewing relevant literature and relating it to different aspects of the proposal, which motivates the research problem's uniqueness, establishes baselines, and synthesizes methodologies and last but not the least automatic generation of literature review. The literature review discusses published information in a particular subject area, and sometimes information in the particular subject area within a certain time period. The quality of the research proposal often hinges on whether the research proposal adequately links to existing articles in the literature that help support the proposed research agenda. Several approaches are designed for automatic retrieval of scientific articles and can be applied to identify articles relevant to a proposal with a detailed description (e.g., abstract) of the proposal serving as the query. However, to get a nuanced view of why a scientific article is relevant to a research proposal, it is necessary to map the retrieved scientific articles to high level thematic categories (henceforth referred to as topics) relevant to the proposal. This mapping can be used for the downstream generation of comprehensive topic-wise literature review as opposed to a monolithic review, thereby improving readability.

Automatic literature review generation is vital for understanding and writing scientific documents and extracting information to synthesize a comprehensive summary. Existing approaches to perform the automated literature review generation are either independently summarized scientific articles or generate citation text for individual scientific articles relevant to a target manuscript independently without considering their relationship to other relevant articles. Existing approaches often generate monolithic extractive or abstractive reviews adversely affecting readability, and lacks in structured subsections linked to specific topics. Citation text generation crafts sentences citing reference papers based on corresponding abstracts, aiming to integrate into the literature review. However, existing methods assume precise knowledge of intents (e.g., background, methodology) behind citing a paper which is unavailable in early stages of research proposal writing. Moreover, these approaches rely solely on the reference paper's abstracts for sentence generation, potentially lacking adequate information for appropriate mapping to an intent or the topic.

Prior approaches to extract text spans from the research papers use the citation texts or queries. Citation intent detection presumes a presence of the citation text to classify papers into predefined categories such as motivation, background. However, during the proposal writing stage, the citation text is unavailable. Moreover, the classification categories for potential reference papers differ for each target proposal. Existing approaches for retrieving scientific papers from a corpus rely either on abstracts and titles of a target paper, detailed textual queries, or specific aspects such as a problem or a methodology. These approaches employ strategies to generate suitable embeddings for queries and research papers, often focusing on a coarser level 'aspects' of the target paper. Catalogue generation aims to automatically create chapter headings for a target proposal based on a set of reference papers. When categorizing literature for a specific target proposal, authors face challenges such as introducing bias, while organizing their papers in diverse ways.

SUMMARY

Embodiments of the present disclosure present technological improvements as solutions to one or more of the above-mentioned technical problems recognized by the inventors in conventional systems. For example, in one embodiment, a processor implemented method of classifying one or more scientific papers to research proposals based on topic is provided. The processor implemented method includes: receiving, via one or more hardware processors, a constructed dataset as an input data using one or more existing research papers; augmenting, via the one or more hardware processors, the constructed dataset with one or more reference text spans to obtain an extended dataset; training, via the one or more hardware processors, a topic-based retriever (TR) model on a subset of the extended dataset by one or more pseudo positive reference text spans, and one or more pseudo negative reference text spans; training, via the one or more hardware processors, a topic classifier (TC) model on a subset of the extended dataset using the research proposal title, one or more proposal topics, and the one or more reference text spans from one or more reference papers retrieved using the one or more pseudo positive reference text spans retrieved using the citation text based retriever model which is labelled as positive, and the one or more pseudo negative reference text spans for the one or more reference papers which are labelled as negative, to classy if the one or more reference papers are aligned to the proposal topic or not; and classifying, via the one or more hardware processors, the one or more reference papers to be relevant to one or more proposal topic in context of the one or more reference text spans retrieved using the topic-based retriever (TR) model with the topic classifier (TC) model. The constructed dataset pertain to (i) a research proposal title, or (ii) an abstract, or (iii) a set of proposal topics, or (iv) the one or more reference papers pertinent to a research proposal, and (v) the one or more citation text under the one or more proposal topics from the set of proposal topics corresponding one or more relevant reference paper. The one or more reference text spans pertain to the one or more pseudo positive reference text spans, and the one or more pseudo negative reference text spans. One or more top-K chunks are identified from the one or more reference papers which is relevant to the one or more citation text based on a retriever model, is considered as one or more reference text spans.

In an embodiment, one or more section headings are identified from one or more target papers to extract one or more in-text citations. In an embodiment, the one or more in-text citations extracted by employing a parsing technique with one or more enhanced regular expressions (Regex) statements. In an embodiment, the extracted in-text citations associated with the set of proposal topics, and one or more citing reference papers are utilized to extract the one or more citation text. In an embodiment, the one or more citation text pertains to one or more texts surrounding the one or more in-text citations. In an embodiment, a similarity score between the one or more citation text and a chunk of the reference paper is calculated. In an embodiment, one or more textual chunks are ranked based on the similarity score to identify the one or more top-k chunks. In an embodiment, a step of classification of one or more scientific papers to one or more research proposal during an inference phase, includes: (i) the research proposal title, the abstract R, and the proposal topic from a test set are inputted to the TR model along with each chunk of a reference paper in the test set tagged to be relevant to the R to calculate the similarity score, (ii) the one or more top k chunks are obtained from the reference paper relevant to the topic of the proposal using the TR model based on the similarity score, (iii) the one or more top k chunk from the reference paper are inputted along with the topic and the proposal to the TC model, and (iv) the reference paper is iteratively classified as a positive or a negative, highlighting if the reference paper is relevant to the one or more proposal topics or not in context of the one or more top-K chunks.

In another aspect, there is provided a system for classification of one or more scientific papers to research proposals based on topic. The system includes a memory storing instructions; one or more communication interfaces; and one or more hardware processors coupled to the memory via the one or more communication interfaces, wherein the one or more hardware processors are configured by the instructions to: receive, a constructed dataset as an input data using one or more existing research papers; augment, the constructed dataset with one or more reference text spans to obtain an extended dataset; train, a topic-based retriever (TR) model on a subset of the extended dataset by one or more pseudo positive reference text spans, and one or more pseudo negative reference text spans; train, a topic classifier (TC) model on a subset of the extended dataset using the research proposal title, one or more proposal topics, and the one or more reference text spans from one or more reference papers retrieved using the one or more pseudo positive reference text spans retrieved using the citation text based retriever model which is labelled as positive, and the one or more pseudo negative reference text spans for the one or more reference papers which are labelled as negative, to classy if the one or more reference papers are aligned to the proposal topic or not; and classify, the one or more reference papers to be relevant to one or more proposal topic in context of the one or more reference text spans retrieved using the topic-based retriever (TR) model with the topic classifier (TC) model. The constructed dataset pertain to (i) a research proposal title, or (ii) an abstract, or (iii) a set of proposal topics, or (iv) the one or more reference papers pertinent to a research proposal, and (v) the one or more citation text under the one or more proposal topics from the set of proposal topics corresponding one or more relevant reference paper. The one or more reference text spans pertain to the one or more pseudo positive reference text spans, and the one or more pseudo negative reference text spans. One or more top-K chunks are identified from the one or more reference papers which is relevant to the one or more citation text based on a retriever model, is considered as one or more reference text spans.

In an embodiment, one or more section headings are identified from one or more target papers to extract one or more in-text citations. In an embodiment, the one or more in-text citations extracted by employing a parsing technique with one or more enhanced regular expressions (Regex) statements. In an embodiment, the extracted in-text citations associated with the set of proposal topics, and one or more citing reference papers are utilized to extract the one or more citation text. In an embodiment, the one or more citation text pertains to one or more texts surrounding the one or more in-text citations. In an embodiment, a similarity score between the one or more citation text and a chunk of the reference paper is calculated. In an embodiment, one or more textual chunks are ranked based on the similarity score to identify the one or more top-k chunks. In an embodiment, a step of classification of one or more scientific papers to one or more research proposal during an inference phase, includes: (i) the research proposal title, the abstract R, and the proposal topic from a test set are inputted to the TR model along with each chunk of a reference paper in the test set tagged to be relevant to the R to calculate the similarity score, (ii) the one or more top k chunks are obtained from the reference paper relevant to the topic of the proposal using the TR model based on the similarity score, (iii) the one or more top k chunk from the reference paper are inputted along with the topic and the proposal to the TC model, and (iv) the reference paper is iteratively classified as a positive or a negative, highlighting if the reference paper is relevant to the one or more proposal topics or not in context of the one or more top-K chunks.

In yet another aspect, a non-transitory computer readable medium for comprising one or more instructions which when executed by one or more hardware processors causes at least one of: receiving, a constructed dataset as an input data using one or more existing research papers; augmenting, the constructed dataset with one or more reference text spans to obtain an extended dataset; training, a topic-based retriever (TR) model on a subset of the extended dataset by one or more pseudo positive reference text spans, and one or more pseudo negative reference text spans; training, a topic classifier (TC) model on a subset of the extended dataset using the research proposal title, one or more proposal topics, and the one or more reference text spans from one or more reference papers retrieved using the one or more pseudo positive reference text spans retrieved using the citation text based retriever model which is labelled as positive, and the one or more pseudo negative reference text spans for the one or more reference papers which are labelled as negative, to classy if the one or more reference papers are aligned to the proposal topic or not; and classifying, the one or more reference papers to be relevant to one or more proposal topic in context of the one or more reference text spans retrieved using the topic-based retriever (TR) model with the topic classifier (TC) model. The constructed dataset pertain to (i) a research proposal title, or (ii) an abstract, or (iii) a set of proposal topics, or (iv) the one or more reference papers pertinent to a research proposal, and (v) the one or more citation text under the one or more proposal topics from the set of proposal topics corresponding one or more relevant reference paper. The one or more reference text spans pertain to the one or more pseudo positive reference text spans, and the one or more pseudo negative reference text spans. One or more top-K chunks are identified from the one or more reference papers which is relevant to the one or more citation text based on a retriever model, is considered as one or more reference text spans.

In an embodiment, one or more section headings are identified from one or more target papers to extract one or more in-text citations. In an embodiment, the one or more in-text citations extracted by employing a parsing technique with one or more enhanced regular expressions (Regex) statements. In an embodiment, the extracted in-text citations associated with the set of proposal topics, and one or more citing reference papers are utilized to extract the one or more citation text. In an embodiment, the one or more citation text pertains to one or more texts surrounding the one or more in-text citations. In an embodiment, a similarity score between the one or more citation text and a chunk of the reference paper is calculated. In an embodiment, one or more textual chunks are ranked based on the similarity score to identify the one or more top-k chunks. In an embodiment, a step of classification of one or more scientific papers to one or more research proposal during an inference phase, includes: (i) the research proposal title, the abstract R, and the proposal topic from a test set are inputted to the TR model along with each chunk of a reference paper in the test set tagged to be relevant to the R to calculate the similarity score, (ii) the one or more top k chunks are obtained from the reference paper relevant to the topic of the proposal using the TR model based on the similarity score, (iii) the one or more top k chunk from the reference paper are inputted along with the topic and the proposal to the TC model, and (iv) the reference paper is iteratively classified as a positive or a negative, highlighting if the reference paper is relevant to the one or more proposal topics or not in context of the one or more top-K chunks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5A through FIG. 5C are exemplary flow diagrams illustrating the method of classifying the one or more scientific papers to the research proposals based on the topic, according to an embodiment of the present disclosure.

DETAILED DESCRIPTION

Figure 1:
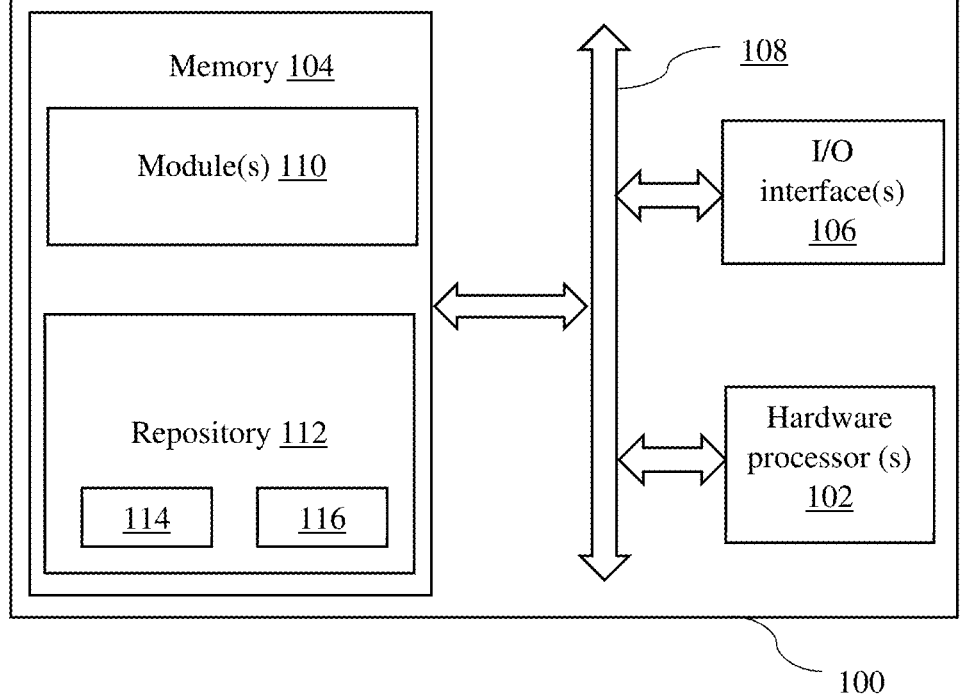
FIG. 1 illustrates a system for a topic-based classification of one or more scientific papers to one or more research proposals, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for an approach to generate a comprehensive literature review featuring well-structured subsections or categories, each grouping articles related to a specific topic. Embodiments of the present disclosure provide a method and system for topic-based classification of scientific papers relevant to research proposal. A human and a large language models (LLM) baselines is established for a task. The embodiments of the present disclosure provide a two-stage approach for article-topic-based classification. During the first stage, one or more reference text spans are retrieved from scientific articles relevant to each topic with a retriever. The trained large language model using synthesized topic-text span pseudo-labels is utilized. For the second stage, we align the scientific articles relevant to one or more topics in the context of the proposal, and the retrieved text spans from the scientific article, formulating the problem as a classification of the task. The research proposal with corresponding title and an abstract R and with a set of topics are considered for forming the catalog denoted as $T_R = t_1, t_2, \ldots, t_k$. A corpus of reference research papers is assumed as $P_R = p_1, p_2, \ldots, p_n$ relevant to R, retrieved using the proposal title and high-level abstract as queries. The task aims to classify a mapping of each research paper $p_i \in P_R$ to each topic $t_j \in T_R$ using binary labels $y_{ij} \in 0, 1$. A dataset is constructed for the task using the available target research papers as target proposals, section headings of the related work section of the proposal as the 'topics' and the papers cited under the section as the reference articles relevant to the 'topics'. Training of the dataset includes samples <R, $p_i$, $t_j$, $C_{ij}$>, where $c_{ij}$ is a citation text citing relevant article $p_i$ under topic $t_j$ of R, whereas during inference phase, availability of the $c_{ij}$ is not assumed. The research proposal refers to a research paper $p_i$ in context of topic $t_j$, taking some textual content of the reference paper $p_i$ into consideration, which are relevant to the proposal and the topic. The text is referred to as reference text span $s_{ij}$. The availability of $s_{ij}$ is not assumed for training as well as for the inference.

Referring now to the drawings, and more particularly to FIGS. 1 through 5C, where similar reference characters denote corresponding features consistently throughout the figures, there are shown preferred embodiments, and these embodiments are described in the context of the following exemplary system and/or method.

FIG. 1 illustrates a system 100 for a topic-based classification of scientific papers to research proposals, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Herein, the memory, for example the memory 104 and the computer program code configured to, with the hardware processor for example the processor 102, causes the system 100 to perform various functions described herein under.

Figure 2A:
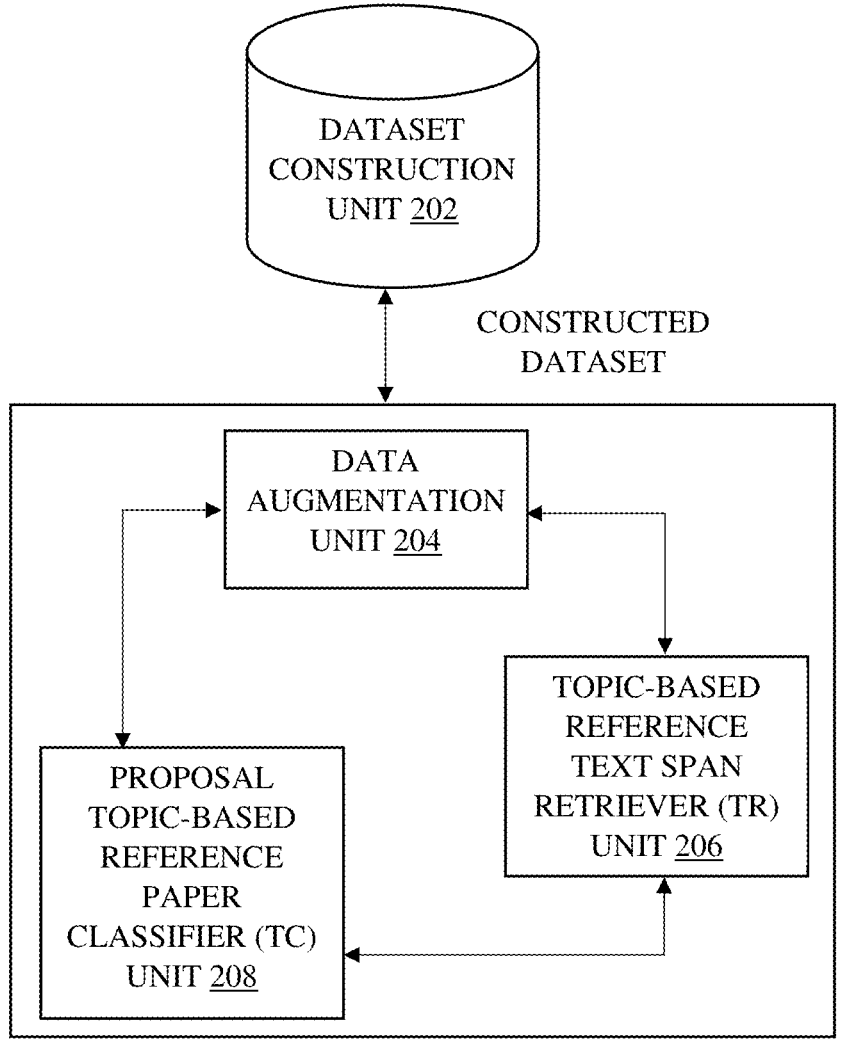
FIG. 2A is an exemplary functional block diagram of the system of FIG. 1 for the topic-based classification of the one or more scientific papers to the one or more research proposals, according to an embodiment of the present disclosure.
Figure 2B:
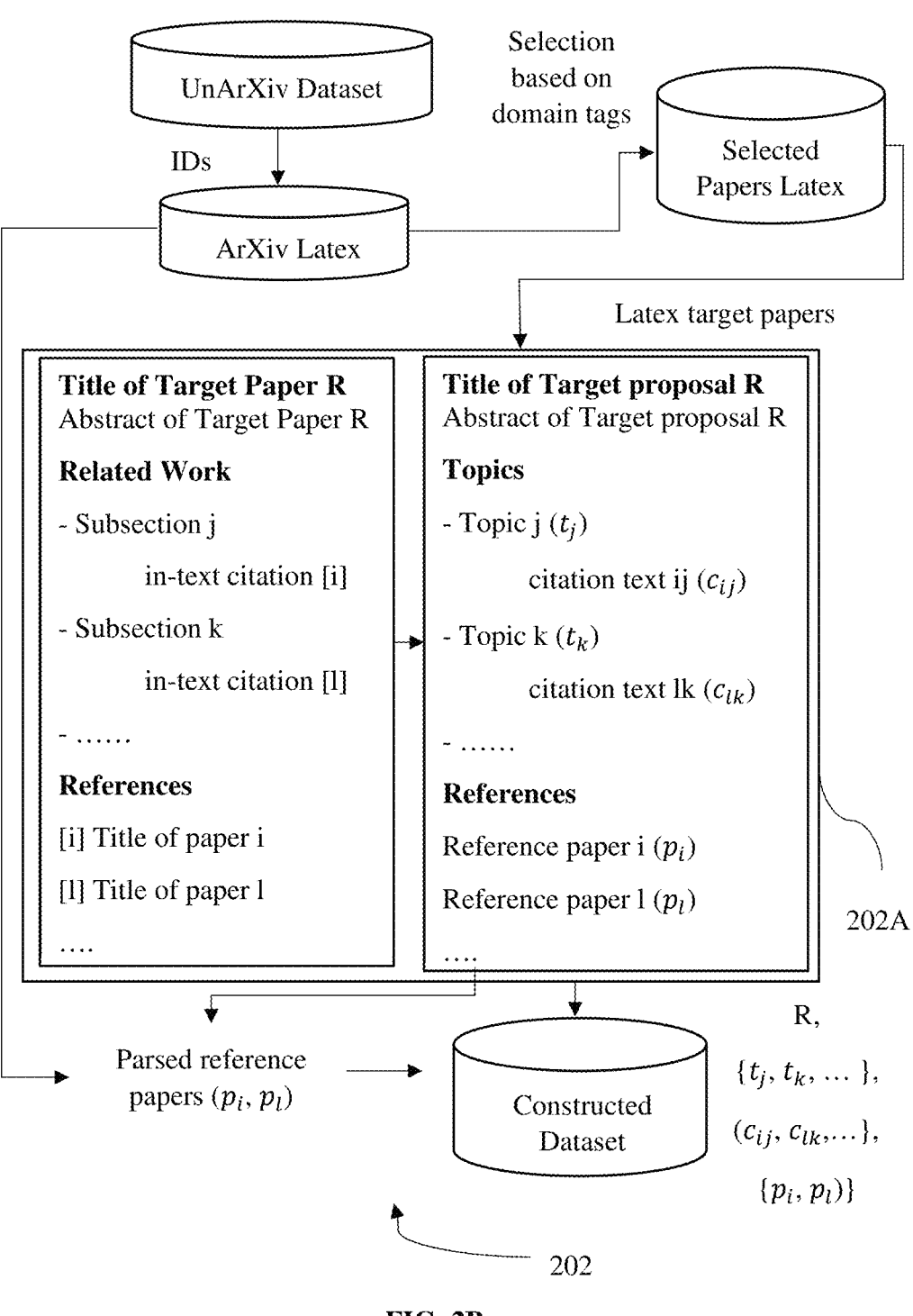
FIG. 2B is an exemplary functional block diagram of the dataset construction unit of the system of FIG. 2A, according to an embodiment of the present disclosure.

FIG. 2A is an exemplary functional block diagram of the system 100 of FIG. 1 for the topic-based classification of the one or more scientific papers to the one or more research proposals, according to an embodiment of the present disclosure. A system 200 may be an example of the system 100 (FIG. 1). In an example embodiment, the system 200 may be embodied in, or is in direct communication with the system, for example the system 100 (FIG. 1). The system 100 includes a dataset construction unit 202, a data augmentation unit 204, a topic-based reference text span retriever ($T_R$) unit 206, and a proposal topic-based reference paper classifier (TC) unit 208. FIG. 2B is an exemplary functional block diagram of the dataset construction unit 202 of the system 200 of FIG. 2A, according to an embodiment of the present disclosure. The dataset construction unit 202 constructs a dataset using at least one existing research paper. The dataset construction unit 202 utilizes one or more UnArxiv IDs to retrieve papers from a ArXiv, obtaining one or more LaTeX sources, and by employing an improved parsing technique with one or more enhanced regular expressions (Regex) statements to extract one or more in-text citations. A LaTeX parser 202A is configured to identify one or more section headings from one or more target papers in a LaTex format, and extracts one or more in-text citations, i.e., $t_j$ or $t_k$, from the sub-section headings of 'related work' sections, or 'literature review' sections. The extracted one or more in-text citations belonging to the one or more topics, citing reference papers, i.e., $p_i$ or $p_l$, is utilized to extract one or more citation texts, i.e., $c_{ij}$ or $c_{lk}$. In an embodiment, the extracted in-text citations associated with the set of proposal topics, and one or more citing reference papers are utilized to extract the one or more citation text. In an embodiment, the one or more citation texts pertains to one or more texts surrounding one or more in-text citations. One or more reference papers $p_i$ or $p_l$ relevant to the one or more topics $t_j$ or $t_k$ is identified. A text of the one or more in-text citations is identified and matched with an entry in a reference section to fetch a title of the one or more reference papers. In an embodiment, a relationship is established between the one or more topics i.e., $t_j$ or $t_k$ to the one or more reference papers i.e., $p_i$ or $p_l$, respectively. A target proposal is selectively retained, to extract multiple topics, and obtain a portable document format (PDFs) of the one or more reference papers for one or more target proposals and topics from various sources i.e., ArXiv, ACL, Semantic Scholar. In an embodiment, contents of the one or more reference papers are extracted by a portable document format (PDFs) extractor.

The constructed dataset pertain to at least one of: (i) a research proposal title, or (ii) an abstract, or (iii) a set of proposal topics, or (iv) at least one reference paper pertinent to a research proposal, and (v) at least one citation text under at least one proposal topic from the set of proposal topics corresponding at least one relevant reference paper. The constructed dataset includes a set of research papers from one or more selected domains from the UnArxiv as target proposals R, the one or more topics of each target proposal $T_R$, and one or more reference papers relevant to a target proposal $p_R$. The ground truth labels of the task, in terms of alignments i.e., a classification of the one or more reference papers to the one or more topics are solicited from the in-text citations, explicitly specified by one or more authors of the target papers. The in-text citations, which are part of the one or more topics i.e., subsections and cite the reference papers, serve as a 'link' between the one or more topics and respective reference papers. An assumption for a training set is chosen i.e., availability of the citation text $c_{ij}$ for every pair $t_j$ and $p_i$. Accordingly, one sample of the training data is depicted by a tuple $<R, p_i, t_j, c_{ij}>$. Similarly, for the test set the samples is $<R, p_i, t_j>$. For example, a total of 2,417 target proposals in the dataset is considered, citing 49,506 reference papers, covering 7, 123 topics, and having 62,520 proposal-topic-reference paper tuples. The target proposals are split into training, validation, and test sets to prevent information leakage across splits. The resulting corpus includes target proposals pertaining to an Artificial Intelligence (AI) (2.69%), a Machine Learning (ML) (15.56%), a Computational Linguistics (CL) (7.28%), a Computer Vision (CV) (73.23%) and a combination of CL and CV (1.24%). The constructed dataset is tailored for mapping research papers to proposal topics, which can be seamlessly extended to tasks i.e., catalogue generation, citation text generation, and a literature review generation. Dataset statistics are summarized in a below mentioned Table 1:

TABLE 1

| Samples | Splits | | | |
| | Train | Validation | Test | Total |
| --- | --- | --- | --- | --- |
| Target Proposals | 1,934 | 241 | 242 | 2,417 |
| Proposal Topics | 5,680 | 720 | 723 | 7,123 |
| Reference Papers | 39,608 | 4,987 | 4,911 | 49,506 |
| Average Topics/ Proposal | 2.94 | 2.99 | 2.99 | 2.95 |
| Average Papers/ Topic | 6.9 | 6.93 | 6.79 | 6.95 |
| Topic-Paper Pairs | 50,116 | 6,329 | 6,075 | 62,520 |

In an embodiment, the topic-based classification of the one or more scientific papers to the one or more research proposals are demonstrated into three stages: (i) augmenting the dataset with one or more positive and negative reference text spans retrieved from the one or more reference papers with a citation text as a query using a retriever model, (ii) training a topic-based reference text span Retriever (TR) and a proposal topic-based reference paper classifier (TC) using the augmented data, and (iii) inference pipeline of retrieving one or more reference text spans relevant to a proposal topic from a reference paper using the trained TR, and then classifying the reference paper to be relevant to the proposal topic in context of the reference text span retrieved using the topic-based retriever (TR) model with the topic classifier (TC) model.

The classification of the one or more scientific papers i.e., reference paper $p_i$ to a proposal topic $t_j$, a reference text span $s_{ij}$ from papers $p_i$ is needed, which is relevant to the proposal topic $t_j$. The retriever model (TR) is trained, by the positive and the negative pairs of topics $t_j$, and the reference text spans $s_{ij}$. In an embodiment, the citation text $c_{ij}$ citing the reference paper $p_i$ as part of the proposal topic $t_j$ of the research proposal R. The citation text $c_{ij}$ is utilized as a 'link' to retrieve the reference text span $s_{ij}$ from the $p_i$, relevant to $c_{ij}$, and consequently relevant to the $t_j$, which allows to form pseudo-positive pairs $<t_j, s_{ij}>$. The reference text spans $s_{ij}$ is retrieved, given the citation text $c_{ij}$, by assessing performance of one or more existing retrieval models on equivalent tasks in a science domain, viz., (i) retrieval of paragraphs from scientific documents given a question, and (ii) retrieval of a text span given the citation text. A retriever model (SR) with a best zero-shot performance for both the tasks is identified.

Figure 3:
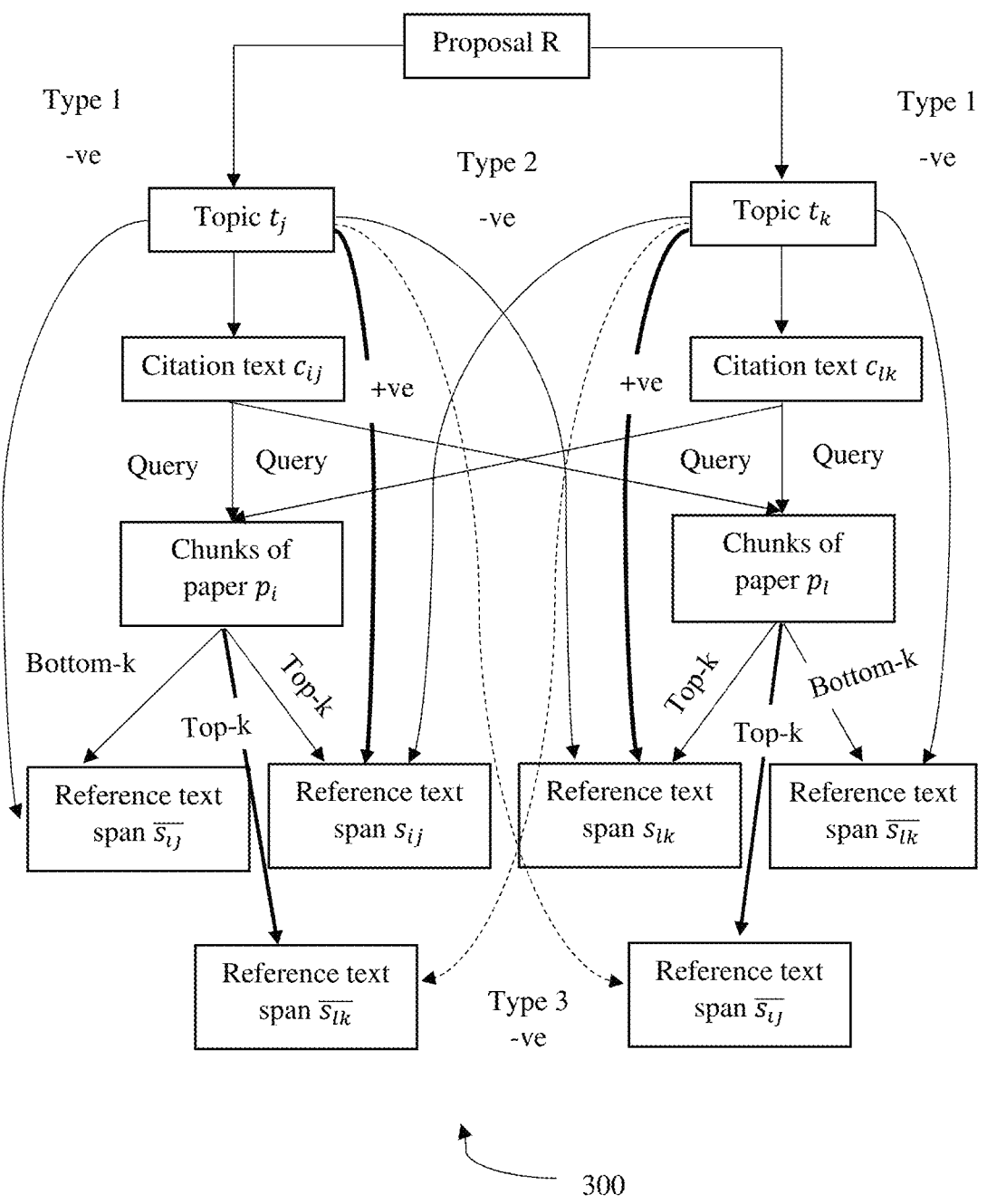
FIG. 3 is an exemplary graphical representation illustrating a process of a negative sampling of reference text spans for one or more topics, according to an embodiment of the present disclosure.

FIG. 3 is an exemplary graphical representation 300 illustrating a process of a negative sampling of reference text spans for one or more topics, according to an embodiment of the present disclosure. The data augmentation unit 204 is configured to augment the constructed dataset with one or more reference text spans to obtain an extended dataset. The one or more reference text spans pertain to the one or more pseudo positive reference text spans, and the one or more pseudo negative reference text spans. The data augmentation unit 204 is configured to chunk the reference paper $p_i$ using a sliding window approach. For example, seven sentences are chosen as a chunk with a stride of three. A top-k chunks from the reference paper which are most relevant to the citation text $c_{ij}$ are retrieved using a best-performing retriever (SR), and these serve as the retrieved reference text span $\hat{s}_{ij}$ of article $p_i$ for the topic $t_j$. A similarity score between the citation text and a chunk of the reference paper, is calculated by taking a log softmax over 'True' and 'False' tokens to obtain a probability of 'True' token as the score. The similarity score is used to rank the chunks. The retrieved top-k chunks may or may not be contiguous. The one or more top-K chunks are identified from the one or more reference papers which is relevant to the one or more citation text based on a retriever model, is considered as one or more reference text spans. In an embodiment, a higher k value for good recall is ensured to avoid a loss of information. The retrieved reference text span $\hat{s}_{ij}$ functions as the pseudo positive pair for topic $t_j$. In an embodiment, three distinct types of the pseudo-negative reference text spans $\overline{s}_{ij}$ is considered for topic $t_j$ as depicted in FIG. 3.

(a) Type 1: A bottom-k chunks retrieved from $p_i$, with citation text $c_{ij}$ of topic $t_j$ as a query, using the SR which serve as easy negatives for the topic $t_j$ of proposal R.

(b) Type 2: Text spans (i.e., top-k chunks) retrieved from reference paper $p_i$, NOT cited in topic $t_j$, but cited in the $t_k$ where k≠j, with the citation text $c_{jk}$ as the query using SR, serve as easy negatives for the topic $t_j$ of the proposal R.

(c) Type 3: With each $c_{ij}$ of topic $t_j$ as the query, retrieving top-k chunks from reference articles $p_i$, NOT cited in topic $t_j$, but cited in $t_k$ where k≠j using SR. The top-k chunks demonstrating maximum similarity with one of the $c_{ij}$ serve as hard negatives for the topic $t_j$ of the proposal R.

The training dataset is augmented with the pseudo positive and negative reference text spans for each topic leading to the resultant dataset, where a sample is depicted by $<R, p_i, t_j, C_{ij}, \widehat{s_{ij}}, \{\overline{S_{ij}}\}>$. Statistics of the augmented dataset i.e., extended dataset for training topic-based retrieval model are illustrated in Table 2:

TABLE 2

| Samples | Splits | | | |
| | Train | Test | Validation | Total |
| --- | --- | --- | --- | --- |
| Positives | 50,116 | 6,329 | 6,075 | 62,520 |
| Easy Negatives | 1,42,637 | 19,382 | 17,635 | 1,79,654 |
| Hard Negatives | 1,10,164 | 15,561 | 13,492 | 1,39,217 |
| Total | 3,02,917 | 41,272 | 37,202 | 3,81,391 |

During training phase, the topic-based reference text span retriever (TR) unit 206 is configured to train the topic-based retriever model TR, which is a Language Model (LM) using the positive and negative topic and reference text span pairs. A probability $\Pr(\text{True} \mid t_j, s_{ij})$ and $\Pr(\text{False} \mid t_j, s_{ij})$ is maximized using a cross entropy loss. Due to the significantly higher number of negative samples compared to positives in the dataset, all positives are included but randomly sub-sample the negatives of each type uniformly to maintain a balanced training dataset. Sampling is performed with replacement for every epoch to ensure the model sees all negatives.

The proposal topic-based reference paper classifier (TC) unit 208 is configured to train the classifier model TC on a subset of the extended training dataset. A sample $<R, t_j, \widehat{s_{ij}}>$ is formed with label $y_{ij}=1$ and $<R, t_j, \overline{s_{ij}}>$ with label $y_{ij}=0$. Given $<R, t_j, s_{ij}>$ as an input, the model learns to classify if the paper $p_i$ can be mapped to the topic $t_j$ in context of R with a supervision from the label $y_{ij}$. During training, a probability $Pr(y=True| R, t_j, s_{ij})$ and $Pr(y=False| R, t_j, s_{ij})$ are maximized using the cross entropy loss.

During inference phase, the proposal title, abstract R, and the topic $t_j$ from the test set are fed to the model $T_R$ along with each chunk $c_i$ of a reference article $p_i$ in the test set tagged to be relevant to R. The model $T_R$ provides the similarity score $sim_{ij}=T_R (t_j, c_i)$ for each $c_i$. The similarity score is calculated by applying a softmax on a logits of the 'true' and 'false' tokens as depicted and taking into consideration the probability $P(True| t_j, c_i)$. In an embodiment, the $c_i$ is ranked for the given R and $t_j$ based on the similarity scores $sim_{ij}$ and use the top-k ranked $c_i$ of paper $p_i$ as the retrieved reference text spans $\widehat{s_{ij}}$ from paper $p_i$, for the topic $t_j$ of R. The R, $t_j$, $\widehat{s_{ij}}$ is fed to the TC to determine the alignment of paper $p_i$. If probability $P(y=True| R, t_j, \widehat{s_{ij}}) \geq 0.5$, then consider $p_i$ to be aligned with $t_j$.

Figure 4A:
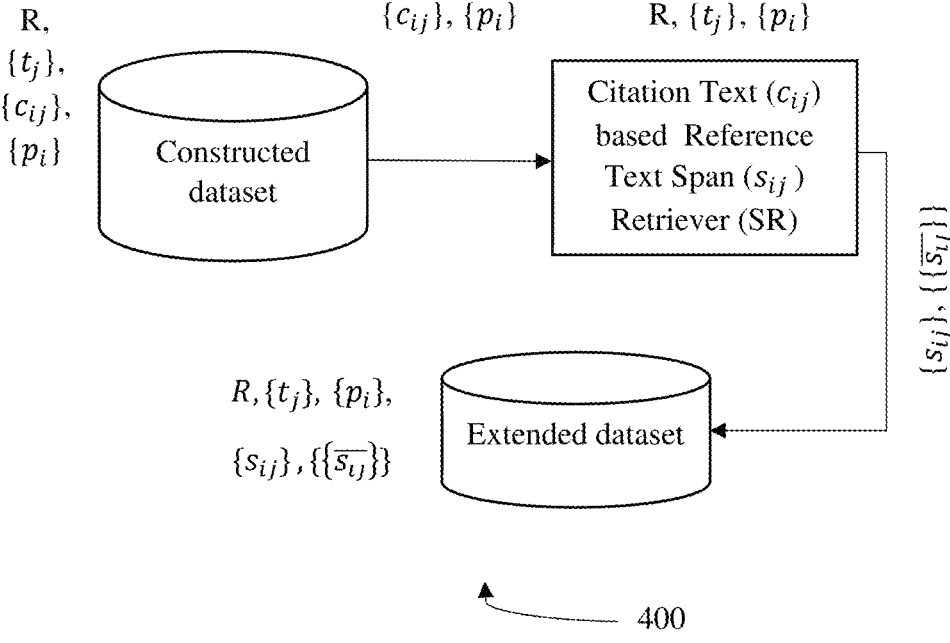
FIG. 4A is an exemplary functional block diagram illustrating a process of augmenting the data, according to an embodiment of the present disclosure.
Figure 4B:
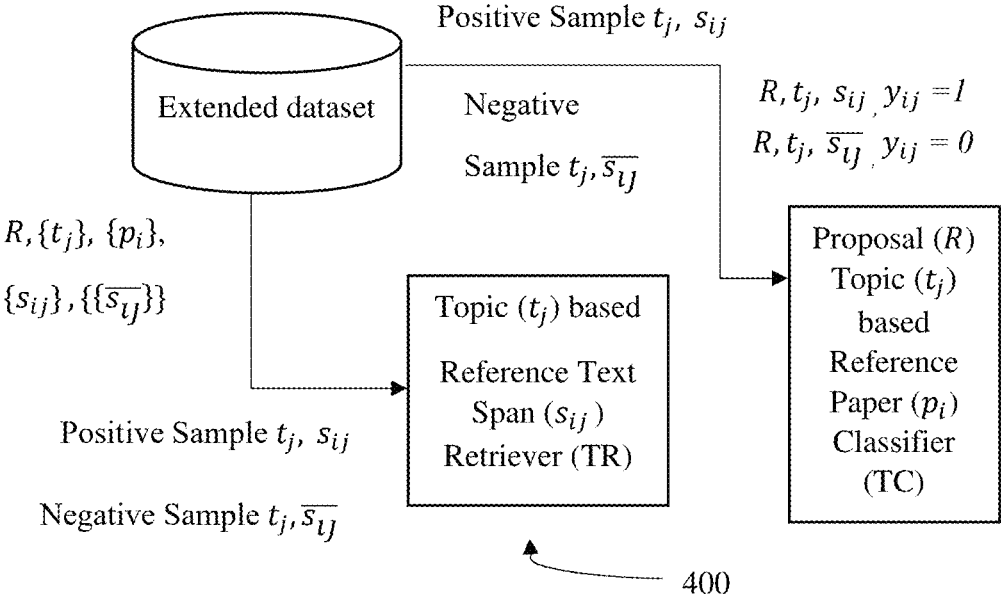
FIG. 4B is an exemplary functional block diagram illustrating the process of training of a topic-based reference text span retriever (TR) model, and a proposal topic based reference paper classifier (TC) model, according to an embodiment of the present disclosure.
Figure 4C:
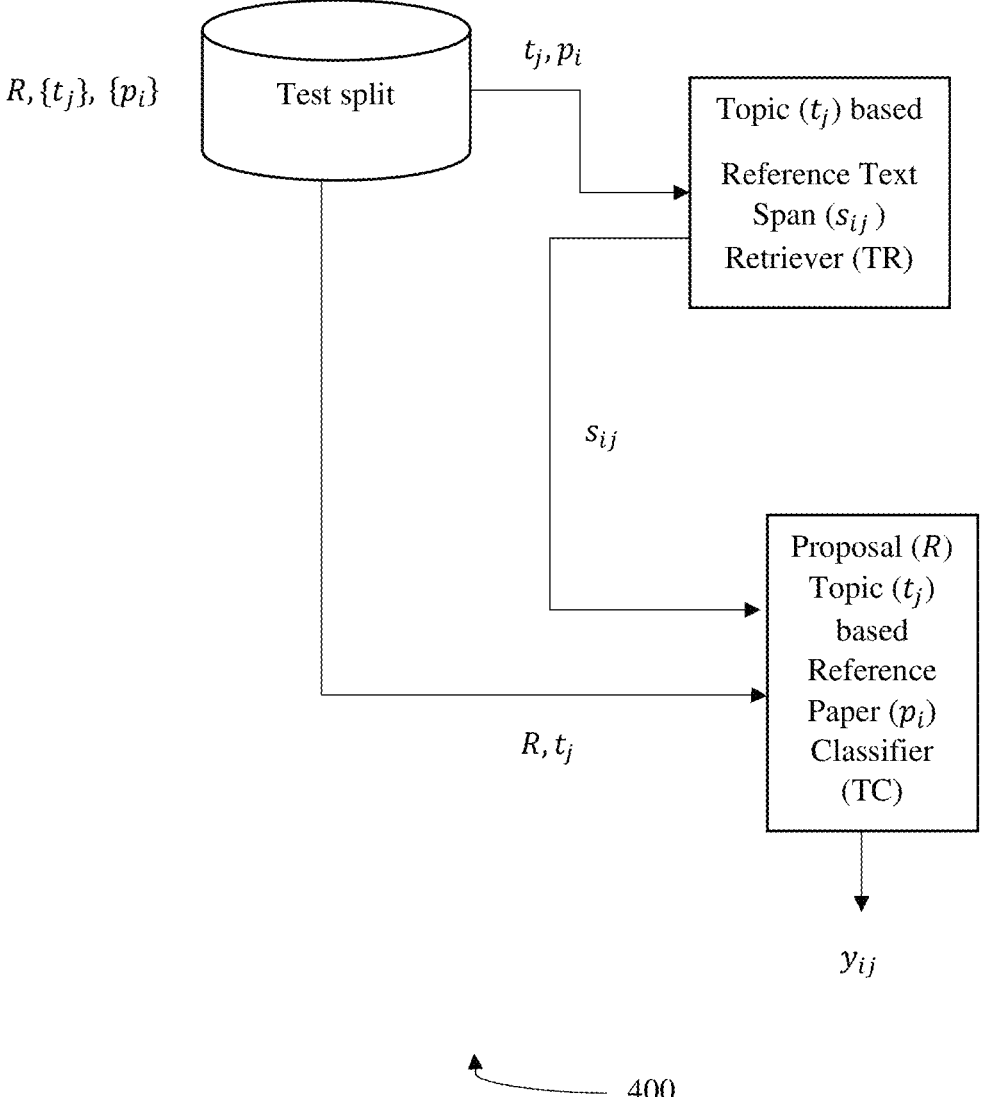
FIG. 4C is an exemplary functional block diagram illustrating the inference phase to classify the one or more scientific papers to the research proposals based on the topic, according to an embodiment of the present disclosure.

FIG. 4A is an exemplary functional block diagram 400 illustrating the process of augmenting the data, according to an embodiment of the present disclosure. FIG. 4B is an exemplary functional block diagram 400 illustrating the process of training of a topic-based reference text span retriever (TR) model, and a proposal topic-based reference paper classifier (TC) model, according to an embodiment of the present disclosure. FIG. 4C is an exemplary functional block diagram 400 illustrating the inference phase to classify the one or more scientific papers to the research proposals based on the topic, according to an embodiment of present disclosure. In an embodiment, one or more stages of proposal topic-based reference paper alignment task, R: proposal title and abstract. PR: Articles relevant to R, TR: Topics relevant to R, $p_i \in P_R$, $t_j$, $t_k \in T_R$, $p_i$, $p_i$ is cited in $t_j$, $t_k$, $C_{ij}$, $c_{jk}$: citation text citing relevant article $p_i$, $p_i$ under topic $t_j$, $t_k$ of R, $s_{ij}$: reference text span from relevant article $p_i$ for topic $t_j$ of R (i.e., Top-K chunks similar to query $c_{ij}$), $\{s_{ij}\}$: text spans negatively sampled for topic $t_j=$(i.e., Bottom-K chunks from $p_i$ NOT similar to query $c_{ij}+$Top-k chunks from $p_i$ similar to query $c_{ik}+$Top-k chunks from $p_l$ similar to query $c_{lj}$), where $p_i$ in $P_R$ is cited in $t_k$, $k\neq j$ and $c_{lk}$: Citation Text citing relevant article $p_l$ under topic $t_k$ of R, $y_{ij}$: is a label and is 1 if article $p_i$ is aligned to topic $t_j$, otherwise 0.

FIG. 5A through FIG. 5C are exemplary flow diagrams illustrating the method 500 of classifying the one or more scientific papers to the research proposals based on the topic, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIG. 1 and FIG. 2A.

At step 502, the constructed dataset (as depicted in FIG. 2B with corresponding description) is received as the input data using the one or more existing research papers. The constructed dataset pertain to (i) the research proposal title, or (ii) the abstract, or (iii) the set of proposal topics, or (iv) the one or more reference papers pertinent to a research proposal, and (v) the one or more citation text under the one or more proposal topics from the set of proposal topics corresponding one or more relevant reference paper. At step 504, the constructed dataset is augmented (as depicted in FIG. 4A with corresponding description) with the one or more reference text spans to obtain an extended dataset. In an embodiment, one or more section headings are identified from one or more target papers to extract one or more in-text citations. In an embodiment, the one or more in-text citations are extracted by employing a parsing technique with one or more enhanced regular expressions (Regex) statements. In an embodiment, the extracted in-text citations associated with the set of proposal topics, and one or more citing reference papers are utilized to extract the one or more citation text. In an embodiment, the one or more citation text pertains to one or more texts surrounding the one or more in-text citations. One or more top-K chunks are identified from the one or more reference papers which is relevant to the one or more citation text based on a retriever model, is considered as one or more reference text spans. In an embodiment, a similarity score between the one or more citation text and a chunk of the reference paper is calculated. In an embodiment, one or more textual chunks are ranked based on the similarity score to identify the one or more top-k chunks.

At step 506, the topic-based retriever ($T_R$) model is trained (as depicted in FIG. 4B with corresponding description) on the subset of the extended dataset by the one or more pseudo positive reference text spans, and the one or more pseudo negative reference text spans (as depicted in FIG. 3 with corresponding description). The one or more reference text spans pertain to the one or more pseudo positive reference text spans, and the one or more pseudo negative reference text spans. At step 508, the topic classifier (TC) model is trained (as depicted in FIG. 4B with corresponding description) on the subset of the extended dataset using the research proposal title, one or more proposal topics, and the one or more reference text spans from one or more reference papers retrieved using the one or more pseudo positive reference text spans retrieved using the citation text based retriever model which is labelled as positive, and the one or more pseudo negative reference text spans for the one or more reference papers which are labelled as negative, to classy if the one or more reference papers are aligned to the proposal topic or not. At step 510, the one or more reference papers are classified (as depicted in FIG. 4C with corresponding description) to be relevant to one or more proposal topic in context of the one or more reference text spans retrieved using the topic-based retriever (TR) model with the topic classifier (TC) model.

During an inference phase, a step of classification of one or more scientific papers to one or more research proposal, includes: (i) At step 512, the research proposal title, the abstract R, and the proposal topic from a test set are inputted to the TR model along with each chunk of a reference paper in the test set tagged to be relevant to the R to calculate the similarity score, (ii) At step 514, the one or more top k chunks are obtained from the reference paper relevant to the topic of the proposal using the TR model based on the similarity score, (iii) At step 516, the one or more top k chunk from the reference paper are inputted along with the topic and the proposal to the TC model, and (iv) At step 518, the reference paper is iteratively classified as a positive or a negative, highlighting if the reference paper is relevant to the one or more proposal topics or not in context of the one or more top-K chunks.

Experimentation Results

For example, evaluation of three models viz, the retriever model (SR), the topic-based reference text span retriever (TR) model, and the proposal topic-based reference paper classifier (TC) model by assessing corresponding performance. The performance of the SR model on evidence and reference text span retrieval tasks by computing evidence F1 score using ground truth evidence and reference text span available in the datasets. The performance of the TR model is evaluated by computing the evidence F1 score. The top-K most similar chunks retrieved from the reference paper using the trained $T_R$ model with a topic as the query forms predicted reference text span $s\hat{r}_{ij}$ for that topic. The top-K most similar chunks retrieved from the reference paper using the SR model with the citation text belonging to that topic as the query forms pseudo ground truth reference text span $sr_{ij}$ for that topic. The evidence F1 score is computed by comparing the top-K chunks. For the evaluation of the TC model, the ground truth binary classification labels for each proposal topic and each reference paper relevant to that proposal is considered. The ground truth labels, and the labels predicted by the TC model for each target proposal topic and reference paper pair to compute a confusion matrix for the binary classification task. The F1 score is chosen as a metric, given that an unbalanced data in terms of classification labels.

For establishing the baselines, the 'Reference Paper Topic Classification' task with human and LLM-generated annotations has been evaluated. An evaluation subset was constructed by uniformly sampling random four target proposals from each of the five domains from the test set and ensuring balanced domain representation. The results have been highlighted in selecting 20 target proposals with 52 topics citing 362 reference papers, forming 378 positive topic-reference paper pairs. An human annotator and the LLM were provided with information about the target proposal's title, the abstract, topic $t_{ij}$, reference paper title $p_i$, and the reference text span of the reference paper $s_{ij}$, retrieved using (i) citation text $c_{ij}$ using the SR model to evaluate the performance of the TC model independently, and (ii) the topic $t_{ij}$ with the trained $T_R$ model to evaluate the performance of complete inference pipeline. The task was to assess the relevance of the reference paper to the given topic, labeling as 1 if the reference paper is found to be suitable to be cited in the topic with the given reference text span; otherwise, 0.

The embodiments of present disclosure provides a task of mapping relevant scientific articles to research proposal topics as a precursor to the literature review generation task for a new research proposal. For example, introduction of a large-scale dataset for the task and establishment of competitive baselines by an expert and the Large Language Model (LLM), underscoring task feasibility. The task assumes the real-life scenario, at the stage of proposal writing, of unavailability of citation text or detailed topic descriptions to retrieve text spans from reference articles relevant to a topic (i.e., during inference), which are required to establish the alignment of reference papers to the topic. The citation text (i.e., available for the training data) is utilized as a link between the topic and the text spans to create pseudo-labels for training a retriever. The pipeline of the present disclosure using much of smaller LMs trained with pseudo-labels yields comparable performance to that of the LLM baseline, demonstrating corresponding efficacy.

The embodiments of present disclosure herein address unresolved problem of existing assumptions made by current scientific literature retrieval methods in automatic literature review generation. The embodiments of present disclosure herein provide a framework for the topic-based classification of scientific papers or reference articles relevant to the research proposal. Instead of generating a monolithic review, the present disclosure serves as a precursor to generate comprehensive literature review for a research proposal that is well organized into the set of topics. The embodiment of present disclosure, thus focus on the task of automatic mapping relevant scientific articles to one or more topics (e.g., proposal-specific topics defined by users) in the research proposal without assuming the existence of sentences used to cite the paper (i.e., citation text). This task precedes the task of generating a literature review with well-structured subsections, each grouping relevant articles by specific topics of interest. The approach of mapping research papers to one or more topics extracts 'text spans' from entire content of the reference paper, ensuring the availability of comprehensive information for mapping. The embodiment of present disclosure retrieves text spans without relying on the availability of citation text or detailed queries, but assumes the presence of high-level topic names. The embodiment of present disclosure assumes the availability of research articles relevant to a proposal and defines the task of mapping these articles to a set of user-defined fine-grained topics relevant to the proposal. The embodiment of present disclosure operates under the assumption that there is (a) a corpus of relevant scientific articles related to the proposal obtained using the provided title and abstract of the proposal, and (b) a user-provided catalog of thematic categories for the target proposal consisting of a list of high-level topics, to which the scientific articles in the corpus need to be aligned.

The embodiment of present disclosure considers a more realistic setting, where the availability of not only the reference papers retrieved to be relevant to a proposal, but also high-level topics provided by the researcher is assumed, based on which he/she wants to categorize the relevant literature and focus on the task of classification of the reference papers, to corresponding topics, and constructs a dataset for benchmarking solutions to the proposed task. The dataset for the task is constructed using the available target research papers as target proposals, the section headings of the related work section of the proposal as the 'topics', and the papers cited under those section as the reference articles relevant to those 'topics'. The resultant is a more personalized approach, classifying cataloging process closely with the researcher's unique perspective. The framework/method of the present disclosure serves as an upstream task for a comprehensive literature review generation task. The classification of retrieved articles to one or more topics further allows generation of a cohesive summary of work related to each topic, taking into consideration diverse perspectives on each reference paper's relevance to the proposal. The framework/method of the present disclosure maps each retrieved scientific article to one or more topics in the catalog, offering a comprehensive understanding of corresponding distinct contributions to the target proposal. Assumption of the real-life setting, at the stage of proposal writing, of unavailability of the citation text or detailed topic descriptions to retrieve the reference text spans from reference articles relevant to a topic (i.e., during the inference stage) which are required to establish the alignment of reference papers to the topic. The citation text (i.e., available for the training data) are used as a link between the topic and the text spans to create pseudo-labels for training the retriever. The embodiment of present disclosure exceeds the baseline LLM with an increase of 13.74% in the F1 score for the classification task, demonstrating corresponding efficacy.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, via one or more hardware processors, a constructed dataset as an input data using at least one existing research paper, wherein the constructed dataset pertain to at least one of: (i) a research proposal title, or (ii) an abstract, or (iii) a set of proposal topics, or (iv) at least one reference paper pertinent to a research proposal, and (v) at least one citation text under at least one proposal topic from the set of proposal topics corresponding at least one relevant reference paper;
   augmenting, via the one or more hardware processors, the constructed dataset with at least one reference text span to obtain an extended dataset, wherein at least one reference text span pertain to at least one pseudo positive reference text span, and at least one pseudo negative reference text span, wherein at least one top-K chunk is identified from at least one reference paper which is relevant to at least one citation text based on a retriever model, is considered as at least one reference text span;
   training, via the one or more hardware processors, a topic-based retriever (TR) model on a subset of the extended dataset by at least one pseudo positive reference text span, and at least one pseudo negative reference text span;
   training, via the one or more hardware processors, a topic classifier (TC) model on a subset of the extended dataset using the research proposal title, at least one proposal topic, and at least one reference text span from at least one reference paper retrieved using at least one pseudo positive reference text span retrieved using the citation text based retriever model, which is labelled as positive, and at least one pseudo negative reference text span for at least one reference paper which is labelled as negative, to classy if at least one reference paper is aligned to the proposal topic or not; and classifying, via the one or more hardware processors, at least one reference paper to be relevant to at least one proposal topic in context of at least one reference text span retrieved using the topic-based retriever (TR) model with the topic classifier (TC) model.

2. The processor implemented method of claim 1, wherein at least one section heading is identified from at least one target paper to extract at least one in-text citation, and wherein at least one in-text citation is extracted by employing a parsing technique with one or more enhanced regular expressions (Regex) statements.

3. The processor implemented method of claim 2, wherein the extracted at least one in-text citation associated with at least one proposal topic, and at least one citing reference paper is utilized to extract at least one citation text, and wherein at least one citation text pertains to one or more texts surrounding at least one in-text citation.

4. The processor implemented method of claim 1, wherein a similarity score between at least one citation text and a chunk of the reference paper is calculated, and wherein one or more textual chunks are ranked based on the similarity score to identify at least one top-k chunk.

5. The processor implemented method of claim 1, wherein a step of classification of at least one scientific paper to at least one research proposal during an inference phase, comprises:

inputting, via the one or more hardware processors, the research proposal title, the abstract R, and the proposal topic from a test set to the TR model along with each chunk of a reference paper in the test set tagged to be relevant to the R to calculate the similarity score;

obtaining, via the one or more hardware processors, at least one top k chunk from the reference paper relevant to the topic of the proposal using the TR model based on the similarity score;

inputting, via the one or more hardware processors, at least one top k chunk from the reference paper along with the topic and the proposal to the TC model; and iteratively classifying, via the one or more hardware processors, the reference paper as a positive or a negative, highlighting if the reference paper is relevant to at least one proposal topic or not in context of at least one top-K chunk.

6. A system comprising:

a memory storing a plurality of instructions;

one or more communication interfaces; and one or more hardware processors coupled to the memory via the one or more communication interfaces, wherein the one or more hardware processors are configured by the instructions to:

receive a constructed dataset as an input data using at least one existing research paper, wherein the constructed dataset pertain to at least one of: (i) a research proposal title, or (ii) an abstract, or (iii) a set of proposal topics, or (iv) at least one reference paper pertinent to a research proposal, and (v) at least one citation text under at least one proposal topic from the set of proposal topics corresponding at least one relevant reference paper;

augment the constructed dataset with at least one reference text span to obtain an extended dataset, wherein at least one reference text span pertain to at least one pseudo positive reference text span, and at least one pseudo negative reference text span, wherein at least one top-K chunk is identified from at least one reference paper which is relevant to at least one citation text based on a retriever model, is considered as at least one reference text span;

train a topic-based retriever (TR) model on a subset of the extended dataset by at least one pseudo positive reference text span, and at least one pseudo negative reference text span;

train a topic classifier (TC) model on a subset of the extended dataset using the research proposal title, at least one proposal topic, and at least one reference text span from at least one reference paper retrieved using at least one pseudo positive reference text span retrieved using the citation text based retriever model, which is labelled as positive, and at least one pseudo negative reference text span for at least one reference paper which is labelled as negative, to classy if at least one reference paper is aligned to the proposal topic or not; and classify at least one reference paper to be relevant to at least one proposal topic in context of at least one reference text span retrieved using the topic-based retriever (TR) model with the topic classifier (TC) model.

7. The system of claim 6, wherein at least one section heading is identified from at least one target paper to extract at least one in-text citation, and wherein at least one in-text citation is extracted by employing a parsing technique with one or more enhanced regular expressions (Regex) statements.

8. The system of claim 7, wherein the extracted at least one in-text citation associated with at least one proposal topic, and at least one citing reference paper is utilized to extract at least one citation text, and wherein at least one citation text pertains to one or more texts surrounding at least one in-text citation.

9. The system of claim 6, wherein a similarity score between at least one citation text and a chunk of the reference paper is calculated, and wherein one or more textual chunks are ranked based on the similarity score to identify at least one top-k chunk.

10. The system of claim 6, wherein the one or more hardware processors are configured by the instructions to classify at least one scientific paper to at least one research proposal during an inference phase, comprises:

input the research proposal title, the abstract R, and the proposal topic from a test set to the TR model along with each chunk of a reference paper in the test set tagged to be relevant to the R to calculate the similarity score;

obtain at least one top k chunk from the reference paper relevant to the topic of the proposal using the TR model based on the similarity score;

input at least one top k chunk from the reference paper along with the topic and the proposal to the TC model; and iteratively classify the reference paper as a positive or a negative, highlighting if the reference paper is relevant to at least one proposal topic or not in context of at least one top-K chunk.

11. One or more non-transitory machine-readable information storage mediums comprising one or more instructions which when executed by one or more hardware processors cause:

receiving a constructed dataset as an input data using at least one existing research paper, wherein the constructed dataset pertain to at least one of: (i) a research proposal title, or (ii) an abstract, or (iii) a set of proposal topics, or (iv) at least one reference paper pertinent to a research proposal, and (v) at least one citation text under at least one proposal topic from the set of proposal topics corresponding at least one relevant reference paper;

augmenting the constructed dataset with at least one reference text span to obtain an extended dataset, wherein at least one reference text span pertain to at least one pseudo positive reference text span, and at least one pseudo negative reference text span, wherein at least one top-K chunk is identified from at least one reference paper which is relevant to at least one citation text based on a retriever model, is considered as at least one reference text span;

training a topic-based retriever (TR) model on a subset of the extended dataset by at least one pseudo positive reference text span, and at least one pseudo negative reference text span;

training a topic classifier (TC) model on a subset of the extended dataset using the research proposal title, at least one proposal topic, and at least one reference text span from at least one reference paper retrieved using at least one pseudo positive reference text span retrieved using the citation text based retriever model, which is labelled as positive, and at least one pseudo negative reference text span for at least one reference paper which is labelled as negative, to classy if at least one reference paper is aligned to the proposal topic or not; and classifying at least one reference paper to be relevant to at least one proposal topic in context of at least one reference text span retrieved using the topic-based retriever (TR) model with the topic classifier (TC) model.

12. The one or more non-transitory machine-readable information storage mediums of claim 11, wherein at least one section heading is identified from at least one target paper to extract at least one in-text citation, and wherein at least one in-text citation is extracted by employing a parsing technique with one or more enhanced regular expressions (Regex) statements.

13. The one or more non-transitory machine-readable information storage mediums of claim 12, wherein the extracted at least one in-text citation associated with at least one proposal topic, and at least one citing reference paper is utilized to extract at least one citation text, and wherein at least one citation text pertains to one or more texts surrounding at least one in-text citation.

14. The one or more non-transitory machine-readable information storage mediums of claim 11, wherein a similarity score between at least one citation text and a chunk of the reference paper is calculated, and wherein one or more textual chunks are ranked based on the similarity score to identify at least one top-k chunk.

15. The one or more non-transitory machine-readable information storage mediums of claim 11, wherein a step of classification of at least one scientific paper to at least one research proposal during an inference phase, comprises:

inputting the research proposal title, the abstract R, and the proposal topic from a test set to the TR model along with each chunk of a reference paper in the test set tagged to be relevant to the R to calculate the similarity score;

obtaining at least one top k chunk from the reference paper relevant to the topic of the proposal using the TR model based on the similarity score;

inputting at least one top k chunk from the reference paper along with the topic and the proposal to the TC model; and iteratively classifying the reference paper as a positive or a negative, highlighting if the reference paper is relevant to at least one proposal topic or not in context of at least one top-K chunk.

\* \* \* \* \*